Figure 1:
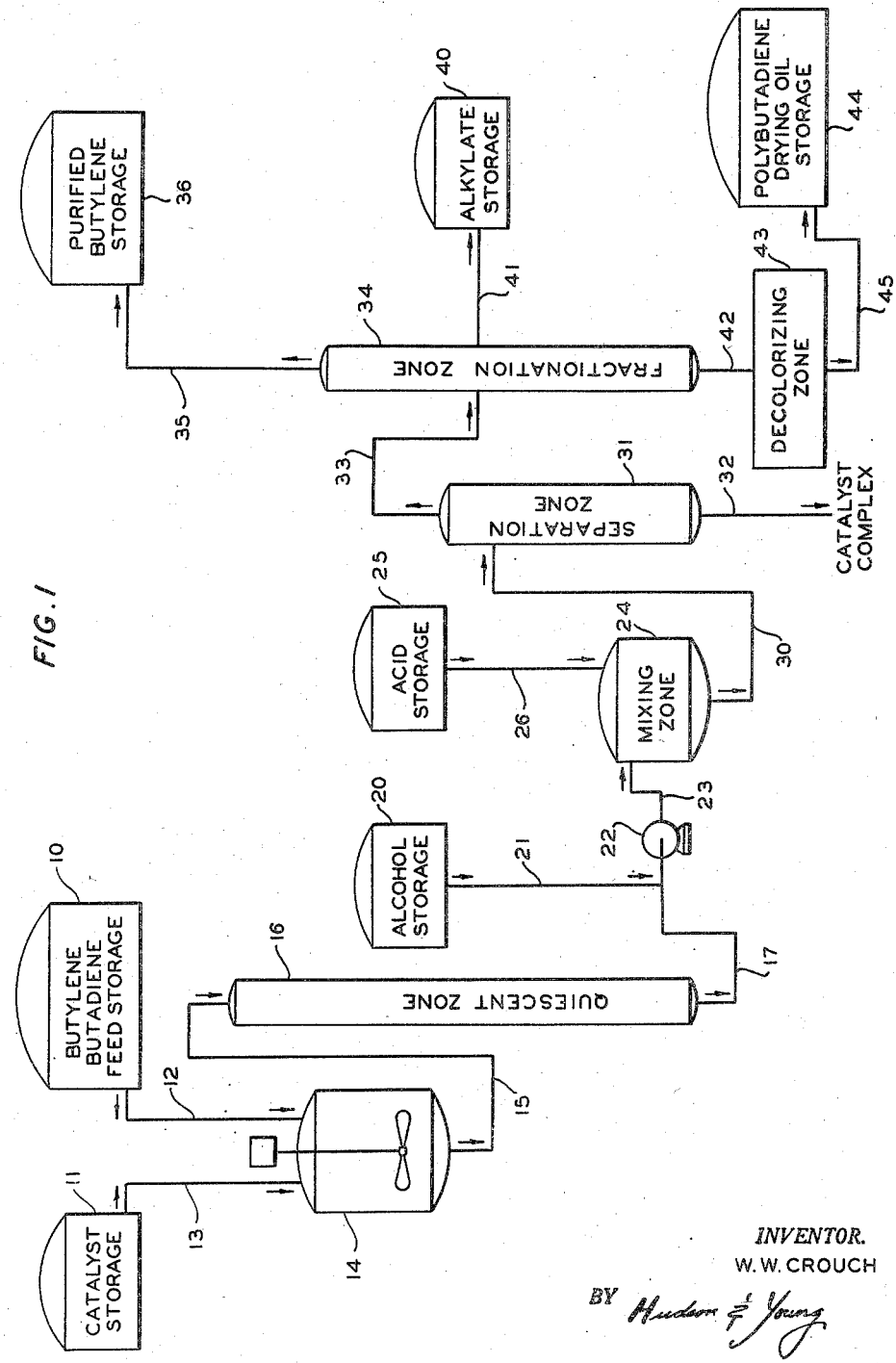

United States Patent Office 2,826,621
Patented Mar. 11, 1958

2,826,621

PRODUCTION OF LIQUID DRYING OIL POLYMER

Willie W. Crouch, Bartlesville, Okla., assignor to Phillips Petroleum Company, a corporation of Delaware Application October 27, 1952, Serial No. 317,051

3 Claims. (Cl. 260—680)

This application is a continuation-in-part of my copending application Serial No. 67,098, filed December 23, 1948, now U. S. Patent 2,631,175. This invention relates to an improved continuous process for the production of a liquid polybutadiene drying oil in high yields. In one of its aspects this invention relates to an improvement in operating the process disclosed in the above noted copending application especially when employing an impure butadiene polymerization feed. In another of its aspects this invention relates to the purification of a butene stream containing butadiene.

When operating a continuous process for the production of a liquid polybutadiene drying oil employing a single reactor a portion of the butadiene from the feedstock passes from the reactor in an unused state. The quantity of unreacted butadiene in the reactor effluent depends upon factors such as rate of reaction and residence time. Another important factor affecting the quantity of unreacted butadiene in the effluent is the severtiy of agitation. Vigorous agitation of the reaction mixture is necessary. By virtue of said vigorous agitation and the continuous addition of fresh feed material to the reaction zone it is inevitable that some butadiene, generally more than is desirable, finds its way into the continuously withdrawn reaction zone effluent. I have discovered that agitation of the system is unnecessary other than at or in the immediate vicinity of the point where the catalyst is introduced, such agitation being required only to initiate the polymerization. My invention is directed to compensating for undesirably large amounts of unreacted butadiene in the effluent from a single continuous reaction zone wherein polybutadiene is produced and comprises, broadly, passing said effluent to a second relatively quiescent reaction zone where the butadiene content of the effluent, on a catalyst and polymer free basis, is reduced at least to 1.5 weight percent and in all instances reduced by at least 50 percent. My invention is particularly useful when a butadiene-butylene mixture is employed as feedstock and purification of the residual butylene is necessary so that it can be used for other purposes, viz., alkylation in the production of aviation gasoline, etc. Also, more complete utilization of the butadiene in the feed is effected.

In the present invention the quiescent zone comprises an elongated vessel, preferably cylindrical and having a length to diameter ratio in the range of 2:1 to 100:1 and can comprise a length of pipe or a coil. The vessel can be horizontally or vertically disposed. If the finely divided metallic catalyst as hereafter disclosed tends to settle from the reaction mixture, it will be preferred that the reaction vessel be vertically disposed. However, due to the fine dispersion of the catalyst particles approaching colloidal size, the problem of settling will not be serious, and a horizontally disposed vessel can be employed without difficulty. The volume of the quiescent zone is sufficient to allow a residence time therein in the range of 5 minutes to 5 hours, the preferred residence time being in the range of 10 to 45 minutes. In continuous operation no agitation is provided in the quiescent zone other than the minor inherent agitation due to the flow of liquids through said zone.

The present process is an improvement over the process disclosed in my aforementioned copending application especially when operating continuously with an impure butadiene feed. The feed which is particularly useful in the process of the present invention comprises a butylene-butadiene mixture containing about 20 to 50 weight percent butadiene with the remainder predominantly various butenes. When employing such a feedstock in accordance with my invention the residual butylene stream, after catalyst separation, is purified to a degree sufficient for use in other processes, such as alkylation and substantially all the butadiene is utilized in the production of polybutadiene. Feed stocks of this nature are readily available commercially and represent a comparatively cheap source of butadiene. Such feed stocks are obtained by separating the $C_4$ fraction of the products from the catalytic cracking of petroleum hydrocarbons as well as by the catalytic dehydrogenation of n-butane. The charge streams applicable for use in the process should be substantially free of acetylenes which tend to poison the catalyst and reduce the activity thereof.

The use of additional solvent when employing a butylene-butadiene feed stream is optional since such a feed stream will normally contain substantial amounts of material which will act as a solvent such as the butenes. The primary purpose of a solvent is to avoid line plugging or other stoppages and to maintain the process smooth and continuous. When employing a concentrated feedstock, rich in butadiene, as for example 98.5 percent pure butadiene as employed in the process of my copending application, supra, it is desirable and often necessary to employ a solvent. In such instances preferred solvents include those which are inert with respect to the catalyst and reactants and which are solvents for the reactants. Included among the preferred solvents are saturated aliphatic and cycloaliphatic hydrocarbons containing from 4 to 10 carbon atoms, boiling preferably above atmospheric temperatures, as for example, n-butane, n-pentane, n-hexane, isooctane, cyclohexane, methylcyclohexane, cyclooctane and the like. Saturated petroleum naphthas can also be employed as well as aromatic hydrocarbon solvents such as benzene, toluene and xylene. The amount of solvent employed will be maintained in the range from 50 parts solvent per 100 parts butadiene to 500 parts solvent per 100 parts butadiene. The solvent can be added to the primary reactor or it can be added to the effluent as it is conveyed to or from the quiescent zone.

Catalysts applicable for use in the present invention include the alkali metals such as sodium, potassium, or lithium, and alloys of the metals with each other or with calcium. A preferred catalyst is sodium metal. The quantity of catalyst added to the reaction mixture and maintained therein will be from 0.2 to 2 weight percent, preferably 0.5 to 2 weight percent, based on the weight of butadiene.

The catalysts are employed in the form of finely divided suspensions, with the alkali metals being most generally preferred. The preparation of the catalyst involves charging a dispersion medium to a conventional type of reaction vessel where it is heated to a temperature above the melting point of the alkali metal catalyst in an atmosphere of dried oxygen-free nitrogen after which the freshly cut metal catalyst is added. The dispersion medium is not a solvent for the catalyst itself. It is preferably a hydrocarbon solvent common to that employed in the reaction mixure of a nature as hereinbefore described. The temperature is adjusted to about 20° F. above the melting point of the catalyst and the mixture vigorously agitated, as with an efficient stirrer operated at high speed (5,000 to 10,000 R. P. M.) for a period usually ranging from 5 to 15 minutes or until a stable dispersion is produced. The system is allowed to cool to about the melting point of the catalyst when agitation is stopped. A catalyst thus prepared is ready for use in the process of this invention. If desired a dispersion stabilizer, for example, a selected mercaptan such as tertiary-dodecylmercaptan, or carbon black, may be employed in the preparation of the catalyst. In the former case the amount of mercaptan used is sufficient to give a quantity of alkali metal mercaptide equivalent to about 0.5 to 5.0 weight percent of the metal catalyst employed, while in the latter case the amount of carbon black introduced is equivalent to from 2 to 20 percent of the weight of the metal catalyst used. A more complete description of the catalyst preparation using dispersion stabilizers may be found in copending applications Serial Nos. 671,899 and 671,900, filed May 23, 1946, now U. S. Patents 2,483,886 and 2,483,887.

When operating within the range of catalyst quantity hereinbefore described it is essential, to obtain a product of low viscosity, that the catalyst be finely dispersed, that is, that the average size of the particles be small. It is essential that the average particle size of the catalyst be below 200 microns and desirable that it be below 100 microns. It is frequently preferred that the average particle size of the catalyst be below 80 microns, say around 40 to 80 microns. When a given concentration is employed, as the particle size of the catalyst is increased polymers of higher viscosity are obtained.

The catalyst dispersion above described usually contains about 5 to 35 weight percent metal based on the dispersion medium employed in its preparation. The amount of dispersion employed is such that the quantity of alkali metal catalyst charged to the reactor will be as hereinbefore stated.

In carrying out the process of my invention the reaction is started by charging the reactants in the proper ratios to a closed reaction vessel free from oxygen. The reaction is continued until the concentration of the polymer in the solvent reaches the desired level. This concentration is in the range of at least 15 weight percent but not in excess of 50 weight percent in said reaction mixture exclusive of butadiene. After the desired concentration level is reached reactants in the proper ratio are then continuously charged to said reaction vessel and an equivalent amount of reaction product is withdrawn and passed to the quiescent reaction vessel as hereinbefore mentioned. The temperature in the reaction vessel is in the range of from 150 to 225° F., preferably from 175 to 210° F. Pressure is maintained sufficiently high to provide liquid phase operation in the reaction vessel. A suitable pressure is in the range from about 0 to 200 p. s. i. g. or higher depending upon the reaction temperature selected. Constant vigorous agitation is supplied to the reaction vessel. The conditions of temperature and pressure maintained in the subsequent quiescent reaction zone are within the ranges mentioned above. In some instances suitable heating means are necessary in the quiescent zone to maintain reaction temperatures. The sum of the reaction periods in the initial reaction zone and quiescent zone is in the range of 1 to 10 hours.

When employing a butylene-butadiene feed to the process the product is a liquid polymer drying oil comprising liquid polybutadiene as the principal product and a small amount of alkylate formed by the reaction between butadiene and 1-butene. The alkylate can be separated from the liquid polybutadiene by fractionation if desired.

Any suitable method for deactivating the catalyst can be used. In a preferred embodiment the catalyst is deactivated by treating the effluent from the quiescent zone with a low molecular weight alcohol such as methanol. The amount of alcohol added will be in excess of the stoichiometric amount required to react with the catalyst. Low molecular weight alcohols which can be employed for this purpose comprise those which contain preferably not more than 4 carbon atoms per molecule, for example methanol, ethanol, 1-propanol, 2-propanol, 1-butanol, 2-methyl-1-propanol, 2-methyl-2-propanol, ethylene glycol, propylene glycol, and butylene glycol. Mixtures of these alcohols can be employed if desired. Such alcohol treatment will preferably be effected in the absence of air.

Subsequent to the alcohol treatment to deactivate the catalyst the reaction mixture is washed with a suitable acid to remove the compounds formed by interaction of catalyst and alcohol. Acids which can be employed include preferably mineral acids such as sulfuric, hydrochloric, hydrobromic, nitric and phosphoric. Said acids are employed in dilute aqueous form such as from 0.05 N to 1.0 N and are used in a sufficient amount to maintain the pH of the treating solution in the range of about 6.5 to 0.1 or below. In some instances an organic acid containing not more than four carbon atoms per molecule can be used.

Referring now in detail to Figure 1 of the drawings, disclosed is a preferred embodiment of my invention. A preferred feedstock is a butylene-butadiene mixture containing about 20 to 50 weight percent butadiene with the remainder predominantly butenes. Such a feedstock is readily obtainable as a $C_4$ fraction from the distillation of the effluent from the catalytic cracking of petroleum hydrocarbons. Such a stream generally has acetylenic impurities removed before use in the present process in order to avoid fouling of the catalyst. In starting the reaction feedstock from zone 10 and catalyst from zone 11 are charged in the proper ratios, as hereinbefore described, via lines 12 and 13, respectively, to closed reaction vessel 14 which is maintained free from oxygen and the resulting mixture maintained in a highly agitated condition. Extraneous solvent is not necessary due to the presence of butenes in the feedstock. The reaction takes place under conditions of temperature and pressure, described more fully hereinbefore, and proceeds until the concentration of polybutadiene reaches at least 15 weight percent but not in excess of 50 weight percent in the reaction mixture exclusive of butadiene. When such a concentration is reached the catalyst and feedstock are continuously charged in the proper ratio and an approximately constant volume of reaction mixture having a concentration of polybutadiene within the proper range is maintained by withdrawing an equivalent quantity of reaction mixture via line 15 where it is continuously passed to relatively quiescent zone 16 of size and shape as hereinbefore described. The reaction mixture continuously withdrawn via line 15 and entering quiescent zone 16 contains generally about 5 weight percent unreacted butadiene on a catalyst and polymer free basis. The conditions of temperature and pressure which obtain in quiescent zone 16 are essentially the same as those in reaction vessel 14. The concentration of unreacted butadiene in the effluent leaving quiescent zone 16 via line 17 is reduced at least to 1.5 weight percent, and in all instances by at least 50 percent. The effluent in line 17 is admixed with methanol from zone 20 via line 21 by means of pump 22 in order to deactivate the alkali metal catalyst and dissolve organo-metallic complexes. If a catalyst dispersion stabilizer, such as carbon black, has been employed, it is desirable to separate solid impurities before alcohol treatment. However, it is necessary that the reaction effluent does not come in contact with air before alcohol treatment.

The alcohol-containing mixture is passed via line 23 to mixing zone 24 where it is mixed with acid from zone 25 via line 26. The acid is employed in dilute aqueous form as hereinbefore described. The resulting mixture is continuously passed via line 30 to separation zone 31 where the aqueous phase containing alkali metal salts and other soluble catalyst residues is recovered via line 32. The organic phase containing butenes, a very small amount of unreacted butadiene and drying oil polymer is passed via line 33 to fractionation zone 34. In fractionation zone 34 butenes from the original feedstock and containing less than 1.5 weight percent butadiene are recovered as overhead via line 35 and passed to storage zone 36. These butenes are in a sufficiently purified state for use in other processes such as alkylation. If desired, the small amount of alkylate formed by reaction of the butenes with butadiene can be separated and passed to storage zone 40 via line 41. However, this is not required since the alkylate is not necessarily undesirable in the drying oil. The drying oil polymer, either with or without the alkylate, is recovered via line 42 and preferably passed to decolorizing zone 43 for suitable decolorization treatment. The clear drying oil polymer is then passed to storage zone 44 via line 45.

Several alternative methods of operating are possible. For example, decolorization of the polymer can be effected before fractionation in order to have a less viscous material to treat. Also, though less preferably, it is possible to separate the residual butylenes from polymer after alcohol treatment but before acid treatment.

The following example is illustrative of the broad principle of my invention in the reduction of unreacted butadiene to a level below 1.5 weight percent and should not be construed as limiting.

EXAMPLE

A run was conducted wherein 1,3-butadiene was polymerized continuously to provide liquid polybutadiene of an average viscosity of 600 Saybolt Furol seconds measured at 100° F. The apparatus consisted of a 5 gallon autoclave which was employed as the reactor, connected in series with a 1 gallon autoclave which was employed as a subsequent reaction zone constituting in principle the quiescent zone described above. Necessary control valves, etc., were also included in the reaction system.

The process was started by first preparing a 4 gallon batch of polymer solution in the 5 gallon reactor. The charge and reaction conditions for said initial batch were as follows:

*Charge*

| | |
|---|---|
| n-Heptane [1] _____ pounds__ | 14.8 |
| 1,3-butadiene (98.5 percent pure) _____ do____ | 9.8 |
| Sodium catalyst (as dispersion) [2] _____ cc__ | 380 |
| Reaction time _____ hours__ | 2 |
| Temperature _____ ° F__ | 185–204 |
| Pressure _____ p. s. i. g__ | 0–27 |
| Vigorous agitation. | |

[1] Commercial grade. The principal diluent was methylcyclohexane along with small quantities of other naphthenes, toluene, isoheptanes and isooctanes.
[2] Dispersion of finely divided metallic sodium in xylene; concentration of about 17 weight percent sodium.

At the end of this stage of the reaction the 5 gallon reactor contained 24.6 pounds of reaction mixture which was comprised of 40 weight percent of polybutadiene in n-heptane.

The process was then placed in continuous operation by the addition of a mixture of 40 weight percent of 1,3-butadiene in n-heptane at a rate of approximately 2 gallons per hour. Sodium catalyst was added to the reactor at 30 minute intervals in charges equivalent to 1.25 weight percent of the butadiene charge rate. Immediately preceding each charge of catalyst, approximately 1 gallon of reaction mixture was removed and run to the 1 gallon autoclave where it was stirred for a short time to effect further utilization of butadiene as evidenced by a drop in pressure to 2 p. s. i. g. Since the subsequent reaction was carried out in a batchwise manner the agitation therein actually simulates to some extent the same operation on continuous basis. However, agitation in a continuous operation is unnecessary in the second reaction zone other than to effect advantageous temperature control. Methanol was then added to deactivate the catalyst. Data showing pressure drop evidencing further butadiene utilization in the 1 gallon autoclave are recorded below. The temperature in the one gallon reactor was allowed to drop about 10° F. which contributed in a small amount to the pressure drop. However, the principal pressure drop was effected by butadiene conversion.

*1 gallon reactor*

| Charge Number | Initial Pressure, p. s. i. g. | Final Pressure, p. s. i. g. | Interval, Minutes |
|---|---|---|---|
| I | 19 | 2 | 8 |
| II | 14 | 2 | 4 |
| III | 13 | 2 | 10 |
| IV | 13 | 2 | 8 |
| V | 13 | 2 | 10 |
| VI | 14 | 2 | 8 |

After 10 minutes conditions in the 5 gallon reactor lined out to a reaction temperature of 202–206° F. and pressure of 13–19 p. s. i. g. Data showing conditions at shut down are recorded in the following table.

The improvement of the present invention is further illustrated by these data wherein at 234 minutes the pressure dropped from 13 p. s. i. g. to 3 p. s. i. g. within a 15 minute interval after the butadiene feed was cut off. This pressure of 3 p. s. i. g. represents a butadiene content of about 1.1 weight percent based on n-heptane.

| Accrued Time, Minutes | Temperature, ° F. | Pressure, p. s. i. g. | Accrued Butadiene-Heptane Charge, pounds |
|---|---|---|---|
| 210 | 205 | 14 | 43.625 |
| 234 | 205 | 13 | 48.5 |
| 234 | Charging Stopped | | |
| 249 | 202 | [1] 3 | (Butadiene content at this pressure was 1.1 weight percent [1] based on heptane). |

Figure 2:
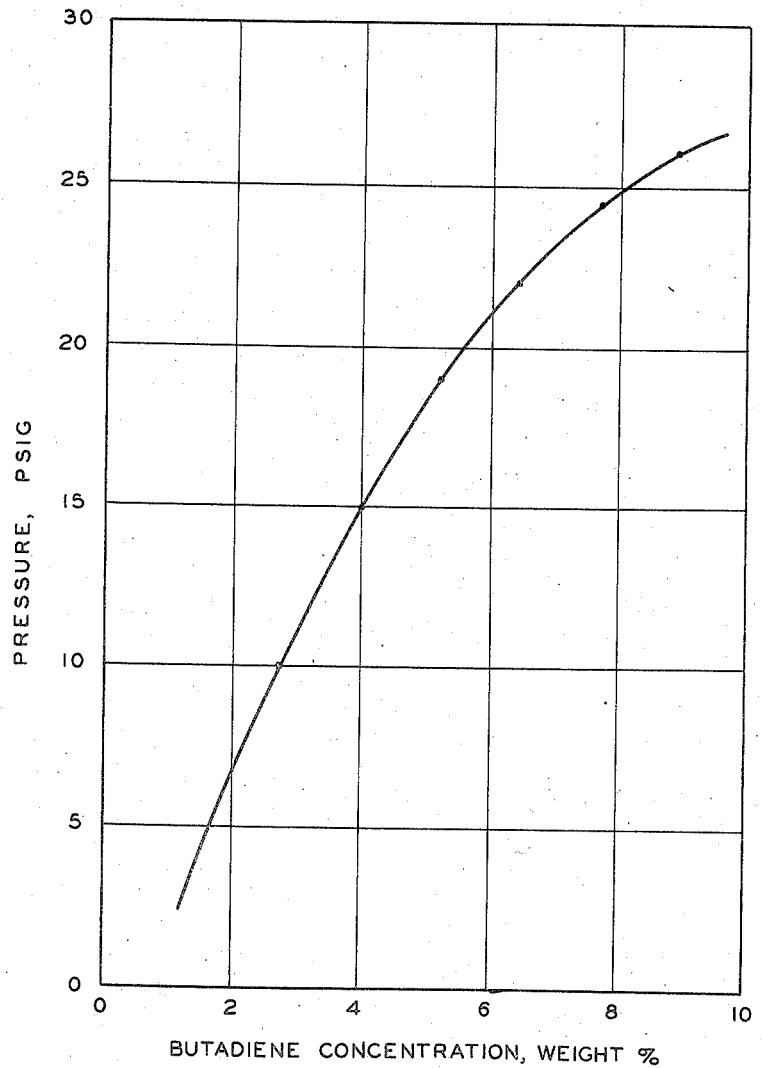

[1] Percent butadiene was extrapolated from the curve (Figure 2), said curve was derived by a study of the pressures exhibited by a 1,3-butadiene-n-heptane-system at an average temperature of 202° F. Incremental amounts of 1,3-butadiene were charged to an autoclave containing 18 pounds of n-heptane and the pressure of the system was then read and plotted against weight percent butadiene. Thus, a given pressure corresponds to a definite butadiene concentration. For example, a pressure of 3 p. s. i. g. represents a concentration of 1.1 weight percent of 1,3-butadiene.

*Summation*

| | |
|---|---|
| Continuous reaction time _____ hrs__ | 3.9 |
| Average residence time in five gallon reactor___hrs__ | 1.98 |
| Average residence time in 1 gallon reactor___min__ | 8 |

While this invention has been described and exemplified in terms of its preferred embodiment those skilled in the art will appreciate that modifications may be made without departing from the spirit and scope of the invention described herein.

I claim:

1. A continuous method for the production of a liquid polybutadiene drying oil free from solid polymers which comprises continuously maintaining approximately constant volume of reaction mixture comprising a highly agitated stable dispersion of finely divided alkali metal catalyst in a body of hydrocarbon solvent containing butadiene and polybutadiene in a closed reaction vessel at a temperature in the range of 150 to 220° F., introducing an impure butadiene polymerization feed containing a hydrocarbon solvent and catalyst having an average particle size less than 200 microns into said body of liquid reaction mixture, withdrawing equivalent quantities of reaction mixture containing an amount of unreacted butadiene of about 5 weight percent on a catalyst and polymer free basis to maintain an approximately constant volume at a rate permitting the formation and maintenance of polybutadiene in a concentration of at least 15 weight percent in said reaction mixture exclusive of butadiene, the quantity of the catalyst employed being not in excess of 2.0 parts by weight per 100 parts of butadiene employed, continuously passing said withdrawn reaction mixture into one end of a relatively quiescent tubular reaction zone having a length to diameter ratio in the range of 2:1 to 100:1 and a volume sufficient to allow a residence time therein in the range of 5 minutes to 5 hours, withdrawing from the opposite end of said quescent zone a quantity of reaction mixture containing no more than 1.5 weight percent unreacted butadiene on a catalyst and polymer free basis, continuously deactivating alkali metal and metallo-organic complexes contained in said mixture by contacting with a low molecular weight alcohol having not more than 4 carbon atoms per molecule, continuously separating the resulting deactivated materials from the mixture by washing with a dilute aqueous mineral acid, continuously separating solvent from polymer, and recovering a liquid polybutadiene drying oil free from solid polymer.

2. The method of claim 1 wherein the alcohol employed for deactivating alkali metal and metallo-organic complexes is methanol.

3. The method according to claim 1 wherein the mineral acid employed for separating deactivated alkali metal and metallo-organic complexes is dilute sulfuric acid.

References Cited in the file of this patent

UNITED STATES PATENTS

| | | |
|---|---|---|
| 2,264,811 | Rothrock | Dec. 2, 1941 |
| 2,527,768 | Schulze et al. | Oct. 31, 1950 |
| 2,603,655 | Strain | July 15, 1952 |
| 2,631,175 | Crouch | Mar. 10, 1953 |
| 2,701,780 | Nelson et al. | Feb. 8, 1955 |
| 2,728,801 | Jaros et al. | Dec. 27, 1955 |

UNITED STATES PATENT OFFICE

CERTIFICATE OF CORRECTION

Patent No. 2,826,621                                    March 11, 1958

Willie W. Crouch

It is hereby certified that error appears in the printed specification of the above numbered patent requiring correction and that the said Letters Patent should read as corrected below.

Column 6, line 66, for "220° F." read -- 225° F. --; column 7, line 10, for "quescent" read -- quiescent --.

Signed and sealed this 27th day of May 1958.

(SEAL)
Attest:

KARL H. AXLINE
Attesting Officer

ROBERT C. WATSON
Commissioner of Patents